No. 844,216. PATENTED FEB. 12, 1907.
O. F. TRACE & W. FIFIELD.
GRAIN SCREEN.
APPLICATION FILED DEC. 12. 1905.
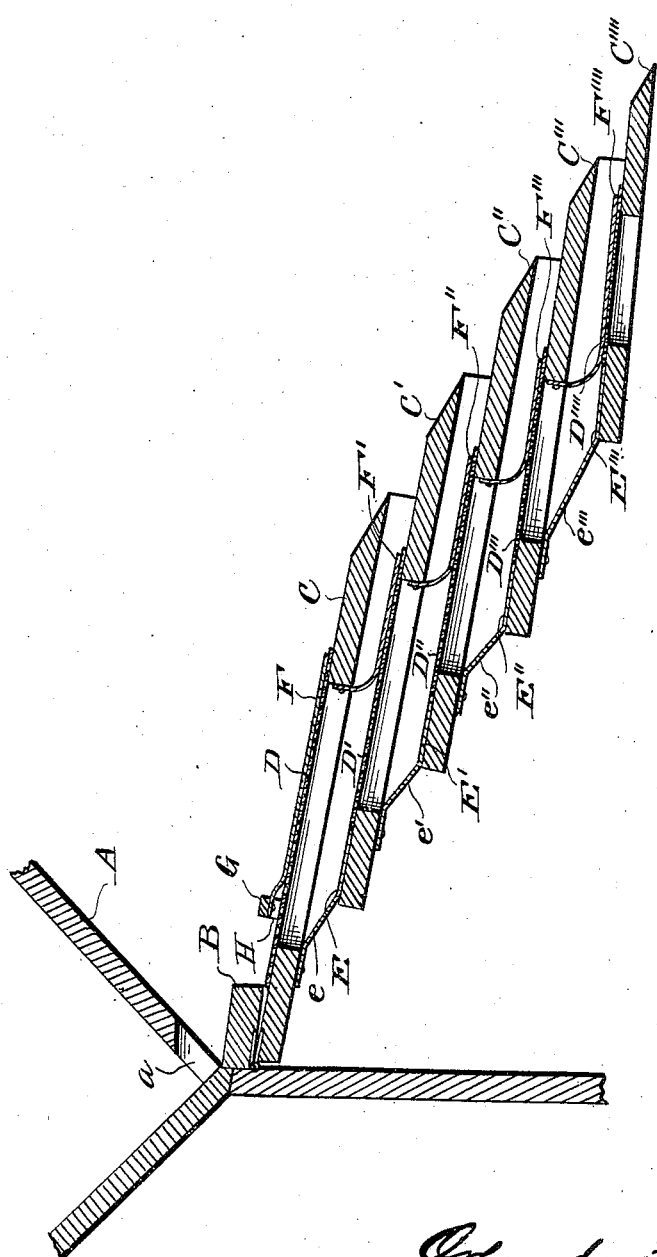
Witnesses
Jos. H. Blackwood
D. Randolph, Jr.
Inventors
Orlando F. Trace
Warren Fifield
By D. A. Gowrick
Attorney
THE NORRIS PETERS CO., WASHINGTON, D. C.

UNITED STATES PATENT OFFICE.

ORLANDO F. TRACE AND WARREN FIFIELD, OF SAUK RAPIDS, MINNESOTA.

GRAIN-SCREEN.

No. 844,216.　　　　　Specification of Letters Patent.　　　　Patented Feb. 12, 1907.

Application filed December 12, 1905. Serial No. 291,457.

*To all whom it may concern:*

Be it known that we, ORLANDO F. TRACE and WARREN FIFIELD, citizens of the United States, residing at Sauk Rapids, in the county of Benton and State of Minnesota, have invented certain new and useful Improvements in Grain-Screens, of which the following is a specification.

Our invention relates to screens for separating two different grains, such as wheat and oats, and consists in providing a battery or plurality of screens having holes shaped to allow the passage of wheat therethrough, but which will prevent the passage of oats when the grains are lying on their sides.

The details of our invention will be particularly described hereinafter and illustrated in the accompanying drawing, which is a vertical sectional view of our improved grain-screen.

Referring to the drawing, A represents a suitable hopper to receive the grain to be separated and having an opening $a$, leading to a platform B. The screen consists of a plurality of open frames C C' C'' C''' C'''', vertically disposed, the opening in each frame being covered by a metal sieve D D' D'' D''' D'''', respectively, having holes shaped to permit the passage of kernels of wheat, but not long enough to let oat-grains through when lying on their sides.

As shown in the drawing, the top frame C is secured to the platform B and slanting downwardly therefrom, the frame being so positioned that the grain after leaving the platform falls on the top of the frame before passing onto the sieve-surface D. The frame C' is arranged under the frame C and parallel therewith, the upper end of the frame being arranged under the sieve D.

E represents a plate of sheet metal secured to the top side of the upper end of frame C' and to the lower side of the upper end of frame C, forming an inclined portion $e$, connecting said frames C and C'. It will be understood that should any oat-grains pass through sieve D because of being in an upright position that they will have to pass in turn over sieve D' and that any grains that pass through the upper end of the sieve will strike the inclined portion $e$ and be thrown on their sides.

The frame C'' is arranged under the frame C' with its upper end spaced apart therefrom at a slightly-greater distance than its lower or delivery end, so that the angle of incline of sieve D'' is not so great as of sieve D. The upper end of frame C'' is also arranged under the sieve D' and has its upper side connected with the under side of frame C' by a plate of sheet metal E', with an inclined portion $e'$, connecting said frames C' and C'', having same function as that described for inclined portion $e$.

The upper end of frame C''' is spaced at a greater distance from frame C'' than the distance which the upper end of said frame C'' is spaced from frame C', while the space between the delivery ends of the frames remain the same, so that the surface of sieve D''' is nearer horizontal than sieve D''. The upper end of said frame C''' is also arranged under sieve D'' and the two frames connected by a plate of sheet metal E'' with an inclined portion $e''$ for the same purpose as portions $e$ and $e'$.

The lowermost frame C'''' has its upper end arranged at a still greater distance beneath frame C''' than the distance between the upper end of frame C''' and frame C'', while the distance between the delivery ends of the frames remain the same, so that the sieve D'''' is still nearer the horizontal than sieve D'''. The upper end of frame C'''' is also arranged so that none of the sieve D'''' is directly under sieve D'''. By this construction it will be understood that all grain that passes through sieve D''' must strike plate E''', which connects frames C''' and C'''', and as inclined portion $e'''$ is under the major portion of sieve D''' grains of oats that remain in the wheat will be made to fall so as to pass on their sides over sieve D'''' and be finally separated from the wheat.

It will be seen from an inspection of the drawing that each succeeding sieve is shorter than the one next above, thus providing for the decrease in the quantity of grain and at the same time providing for a greater percentage of the area under each sieve being made up of the imperforate plates E E' E'', and finally the plate E''', covering the entire area under sieve D'''. Another advantage gained in our screen is that as the frames C'', C''', and C'''' are each nearer horizontal than the frame next above the speed of the grain passing through the sieves is gradually diminished, thus causing it to pass slowly over the final sieve D'''' and adding to the effectual separation of any foreign grains that might still remain in the wheat.

We have shown no apparatus for shaking our improved screen; but it will be understood that this may be added, if desired, without altering the spirit of our invention as expressed in the following claim.

As there is a tendency in grain to tumble down an inclined screen, especially when shaken, we provide aprons F, F', F'', F''', and F'''', made of any suitable fabric—such as canvas, oil-cloth, &c—that lie over the sieves D, D', D'', D''', and D'''', respectively, to prevent the grain from tumbling over the screen, as stated. The apron F is secured to a cross-piece G, secured to uprights H on the sides of the frame C, sufficient space being allowed between the cross-piece G and screen to allow the grain flowing from platform B to pass between apron F and sieve D. The apron F' is secured to the under side of frame C at the lower end of the frame next to the opening where sieve D is secured, apron F'' in the same relative position under frame C', F''' under frame C'', and apron F'''' under frame C'''.

Having thus described our invention, what we claim is—

A grain-screen consisting of a plurality of inclined frames arranged one below the other and each having sieves secured therein, each of said sieves being inclined at a greater angle than the sieve immediately beneath it, the upper edge of each frame being arranged beneath the sieve in the frame immediately above it, an inclined plate connecting the upper and lower sides of adjacent frames, said inclined plate being under the upper end of the sieve in the frame immediately above it, and aprons secured above each sieve, substantially as shown and described.

In testimony whereof we hereto affix our signatures in the presence of two witnesses.

ORLANDO F. TRACE.
WARREN FIFIELD.

Witnesses:
J. I. DONOHUE,
J. E. C. ROBINSON.